United States Patent
Schulman et al.

(10) Patent No.: US 7,439,821 B2
(45) Date of Patent: Oct. 21, 2008

(54) DC TO DC TRANSMISSION SYSTEM

(75) Inventors: Joseph H. Schulman, Santa Clarita, CA (US); John C. Gord, Venice, CA (US)

(73) Assignee: Alfred E. Mann Foundation for Scientific Research, Santa Clarita, CA (US)

( * ) Notice: Subject to any disclaimer, the term of this patent is extended or adjusted under 35 U.S.C. 154(b) by 487 days.

(21) Appl. No.: 11/228,751

(22) Filed: Sep. 16, 2005

(65) Prior Publication Data

US 2006/0203404 A1   Sep. 14, 2006

Related U.S. Application Data (60) Provisional application No. 60/661,801, filed on Mar. 14, 2005.

(51) Int. Cl.
*H01P 1/10* (2006.01)
*H01P 5/12* (2006.01)

(52) U.S. Cl. .............. 333/1; 333/262; 336/15; 336/20; 336/30

(58) Field of Classification Search ............. 363/15–33; 333/262, 1
See application file for complete search history.

(56) References Cited

U.S. PATENT DOCUMENTS

| | | | |
|---|---|---|---|
| 5,027,264 A * | 6/1991 | DeDoncker et al. | 363/16 |
| 5,208,740 A * | 5/1993 | Ehsani | 363/124 |
| 5,999,849 A | 12/1999 | Gord et al. | |
| 6,067,474 A | 5/2000 | Schulman et al. | |
| 6,944,033 B1 * | 9/2005 | Xu et al. | 363/16 |

* cited by examiner

*Primary Examiner*—Benny Lee
*Assistant Examiner*—Kimberly E Glenn
(74) *Attorney, Agent, or Firm*—Malcolm J. Romano (57) ABSTRACT

A DC to DC transmission system includes at least three conductors between a source and a sink, a first switch which alternately connects each conductor to the source, a second switch which alternately connects each conductor to the sink. The switches are synchronized such that one conductor is alternately coupled between the same polarity side of the source and sink and another conductor is alternately coupled between the other polarity side of the source and sink. The alternating connection between the conductors and source and sink may be undertaken at a wide range of frequencies.

38 Claims, 5 Drawing Sheets

TRUTH TABLE

| TIME SLICE ON FIG 2 | $Q_C$ | $\bar{Q}_B$ | $Q_A$ | $L_1$ | $L_2$ | $L_3$ |
|---|---|---|---|---|---|---|
| 1  | 0 | 0 | 1 | 0 | 1 | 1 |
| 2  | 1 | 0 | 1 | 0 | 0 | 1 |
| 3  | 1 | 0 | 0 | 1 | 0 | 1 |
| 4  | 1 | 1 | 0 | 1 | 0 | 0 |
| 5  | 0 | 1 | 0 | 1 | 1 | 0 |
| 6  | 0 | 1 | 1 | 0 | 1 | 0 |
| 7  | 0 | 0 | 1 | 0 | 1 | 1 |
| 8  | 1 | 0 | 1 | 0 | 0 | 1 |
| 9  | 1 | 0 | 0 | 1 | 0 | 1 |
| 10 | 1 | 1 | 0 | 1 | 0 | 0 |
| 11 | 0 | 1 | 0 | 1 | 1 | 0 |
| 12 | 0 | 1 | 1 | 0 | 1 | 0 |

REPEAT

FIG. 6

CONDUCTOR TRUTH TABLE

| TIME SLICE | $L_3$ | $L_2$ | $L_1$ | SWITCH SETTING S4 | S5 | S6 |
|---|---|---|---|---|---|---|
| 5  | 0 | 1 | 1 | N    | +(1) | -(0) |
| 6  | 0 | 1 | 0 | -(0) | +(1) | N    |
| 7  | 1 | 1 | 0 | -(0) | N    | +(1) |
| 8  | 1 | 0 | 0 | N    | -(0) | +(1) |
| 9  | 1 | 0 | 1 | +(1) | -(0) | N    |
| 10 | 0 | 0 | 1 | +(1) | N    | -(0) |

DC TO DC TRANSMISSION SYSTEM

RELATED APPLICATION(S)

The present application claims the benefit under 35 USC 119(e) to Provisional Patent Application U.S. Ser. No. 60/661,801, filed Mar. 14, 2005 and entitled "A DC TO DC TRANSMISSION SYSTEM".

DESCRIPTION OF THE PREFERRED EMBODIMENT

Figure 1:
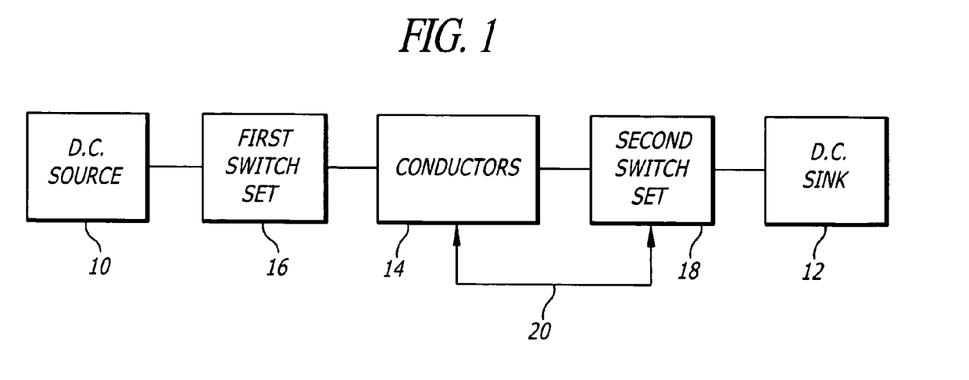
FIG. 1 is block diagram of a DC to DC transmission system of an embodiment of the present invention.

Referring to FIG. 1 there is shown in block diagram format an embodiment of the present invention. A direct current (DC) source 10 acts as a voltage source and/or energy source to apply a DC voltage and/or delivering energy to a load or DC sink 12. The invention has particular utility when used in an implantable medical device when exposure of body tissue to direct current signals is to be avoided. This may occur, for example, in the event that conductors carrying DC signals have an insulation breach and the tissue surrounding the breach is exposed to direct current signals. A rapidly time varying signal carried over such conductors poses much less of a concern in the event that such signals come into contact with body tissue.

To transfer direct current energy to a DC sink across electrical conductors, an embodiment of the invention utilizes a plurality of conduits, preferably three or more conductors, coupled between the source 10 and sink 12. For purposes of describing an embodiment of the invention, a three conductor embodiment and a DC source having a positive polarity side and a negative polarity side is described below.

A first switch set 16 is connected between the source 10 and conductors 14 and a second switch set 18 is connected between the conductors 14 and sink 12. The first switch 16, as will be shown below, has a number of switches, which includes a dedicated switch coupled between the source 10 and each respective one of the conductors 14. The switches are configured to open and close in a predetermined sequence and at a predetermined frequency so as to alternately connect each conductor to the positive polarity side of the source 10 and then to the negative polarity side of the source 10 (see FIG. 2) and vice versa. Accordingly, an essentially square wave signal, at the predetermined frequency, will appear on each one of the conductors rather than a direct current signal. The second switch set 18 includes a dedicated switch between each respective conductor and the sink 12. Each switch is opened and closed so as to alternately connect each conductor to the positive polarity side of the sink 12 and then to the negative polarity side of the sink 12 and vice versa. The operation of the first switch set 16 and the second switch set 18 is synchronized such that at any one time a conductor is connected between the positive polarity side of the source 10 and the positive polarity side of sink 12 and another conductor is connected between the negative polarity side of source 10 and the negative polarity side of sink 12.

As will be shown below, a method of synchronizing switch set 18 to switch set 16 to achieve the conductor connection protocol is by monitoring the polarity of the signals on each of the conductors 14 by way of sense line 20. Based upon the monitored signals, the switches within switch set 18 are opened or closed so as to be in synchronization with the switches in switch set 16 to accomplish the desired source to sink connections. Although connections between the source 10 and sink 12 have been described with respect to the positive and negative polarity sides, it is to be understood in practice the positive or negative polarity sides may, in fact, be a "ground" connection with the system nevertheless having similar operational characteristics, the distinction being merely in reference potentials rather than system operation. Moreover, the polarity of the "sides" of both the source 10 and sink 12 may be the same, varying only in magnitude.

Figure 2:
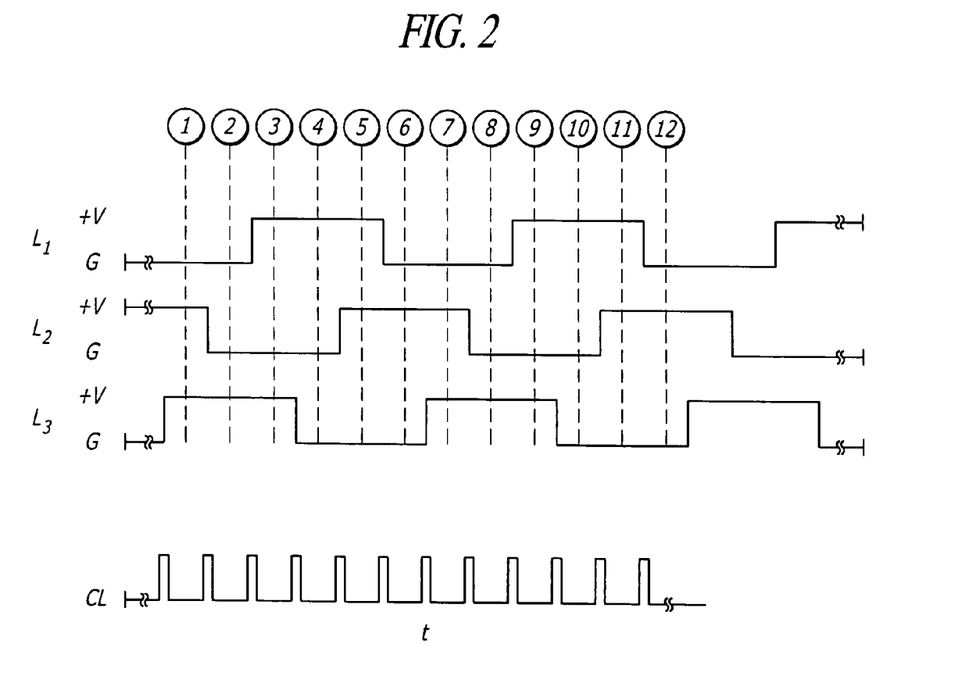
FIG. 2 shows wave shapes of signals carried on a three conductor embodiment of the invention of FIG. 1.
Figure 3:
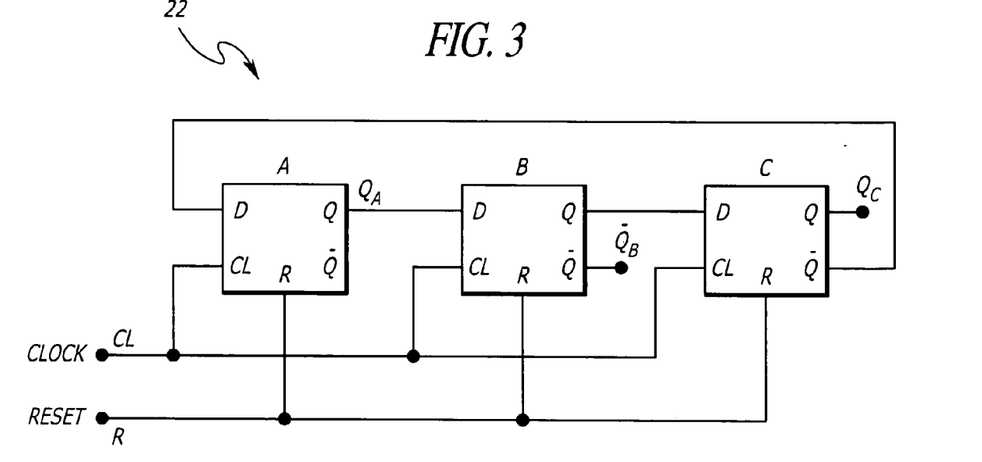
FIG. 3 is a block diagram of a three-stage ring counter or Johnson counter utilized in an embodiment of the invention of FIG. 1.

As an example of the foregoing embodiment of the invention, reference is made to FIG. 2 showing a time varying essentially square wave signal appearing on respective ones of the conductors $L_1$, $L_2$ and $L_3$ of a three wire conductor that comprises conductors 14. As can be observed, the signals on conductors $L_1$, $L_2$ and $L_3$ have the same frequency and alternate (in this example) between a positive potential and ground potential at a predetermined sequence or phase relative to each other. To generate the wave forms of FIG. 2 from DC source 10, a conventional ring counter 22 or Johnson counter, as shown in FIG. 3, may be utilized. The ring counter 22 includes three D flip flops A, B and C having a common clock signal CL and a common reset signal R. The reset signal R is applied at the time transmission is to commence to ensure that each flip flop will be in the proper state to provide the intended sequencing of the signals on the conductors. To alternately connect each conductor to the DC source 10 and ground, three complimentary pairs of switches typically comprising a PFET and a NFET that are coupled to respective flip flop outputs may be used.

Figure 4:
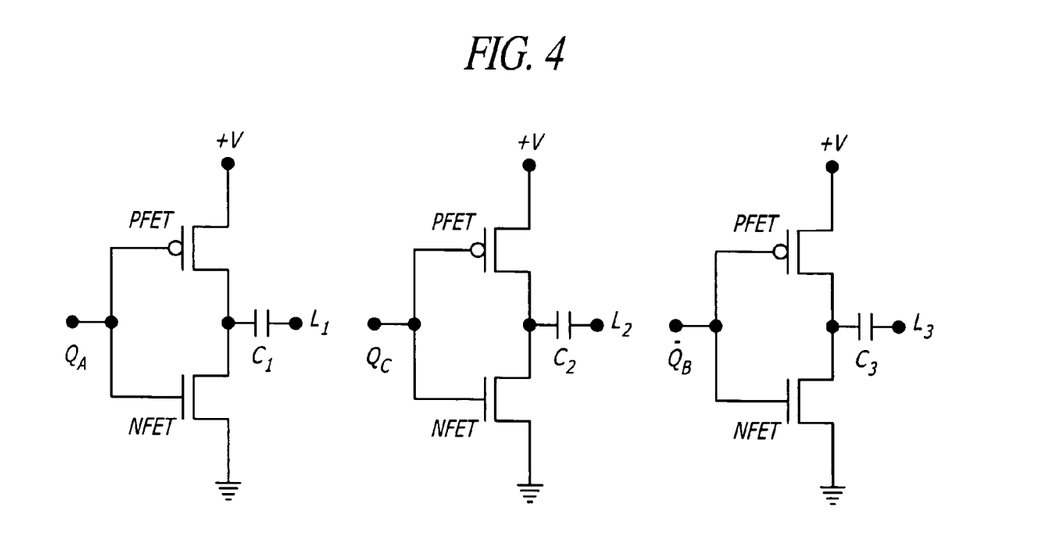
FIG. 4 shows a complimentary switch drive for each conductor of a three conductor embodiment of the invention of FIG. 1.

Referring to FIG. 4 there is shown three complimentary PFET/NFET switches, one switch dedicated to each one of the conductors $L_1$, $L_2$ and $L_3$. The gates of each of the FETs are driven by the respective ring counter flip flop output $Q_A$, $Q_C$, and $\overline{Q_B}$ and the drains (or sources) of the FETs are tied together and coupled to respective conductors $L_1$, $L_2$ and $L_3$. With regard to conductor $L_1$, when the output $Q_A$ of flip flop A is high, the PFET of the respective switch is "off" and the NFET is "on" thereby coupling $L_1$ to ground. When the output $Q_A$ is low, the PFET is "on" and the NFET is "off" thereby coupling $L_1$ to +V. A similar analysis applies for conductors $L_2$ and $L_3$ and their respective first switch set 16 switches.

Figure 5:
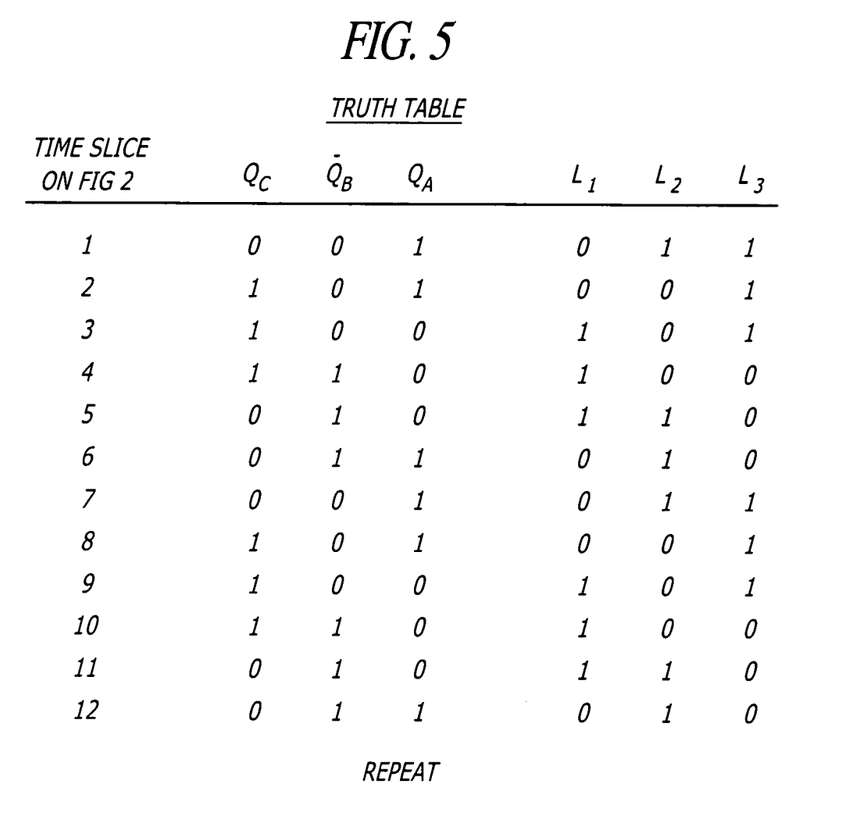
FIG. 5 shows a "truth table" of the outputs of the ring counter of FIG. 3 at specific time slices shown in FIG. 2 to produce the wave shapes shown in FIG. 2.

The truth table of FIG. 5 illustrates a sequencing protocol, that is, the state of flip flop outputs $Q_A$, $\overline{Q_B}$ and $Q_C$ as a function of time and the corresponding polarity of $L_1$, $L_2$ and $L_3$. The numbered time slice relates to equally spaced time intervals used to correlate flip flop outputs and the polarity of potentials on conductors 14. The time of occurrence of each successive clocking pulse shown in FIG. 2, is the time at which the polarity of potentials on respective conductors changes in accordance with the described switching logic. The frequency of the wave shapes shown in FIG. 2 is related to the clocking frequency of ring counter clock signal CL. Although not to be considered in a limiting sense, a clocking frequency from about 25 kilohertz to about 400 kilohertz is within the contemplation of a disclosed embodiment of the invention. Such frequency range is equivalent to switching the switches from about 50,000 to 800,000 times per second.

Figure 6:
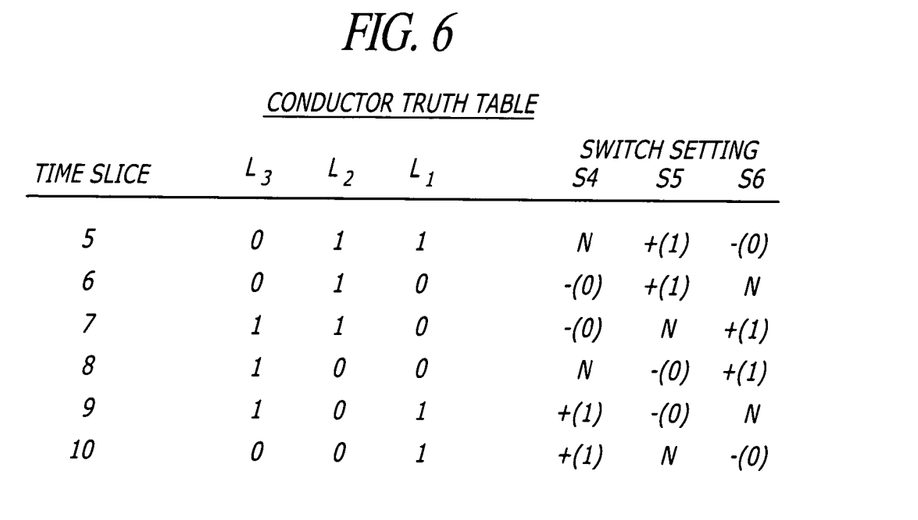
FIG. 6 shows a "truth table" relating to the switch settings of a second switch set and the conductor potentials for an embodiment of the invention of FIG. 1.

In order to synchronize the operation of the second switch set 18 to that of the first switch set 16 so as to connect a conductor between the same polarity side of the source 10 and sink 12, the potential (signal polarity) on each conductor is monitored and used as control switch set 18 controls signals. Referring now to FIG. 6, a conductor "truth table" is shown identifying the state or potential (1 for "high" and 0 for "low") on lines $L_1$, $L_2$ and $L_3$ at sequential time slices arbitrarily starting at time slice 5 (see FIG. 2). The table repeats sequentially as a function of time. As will be discussed below, the switch setting entries relate to the condition of switches $S_4$, $S_5$ and $S_6$.

Figure 7:
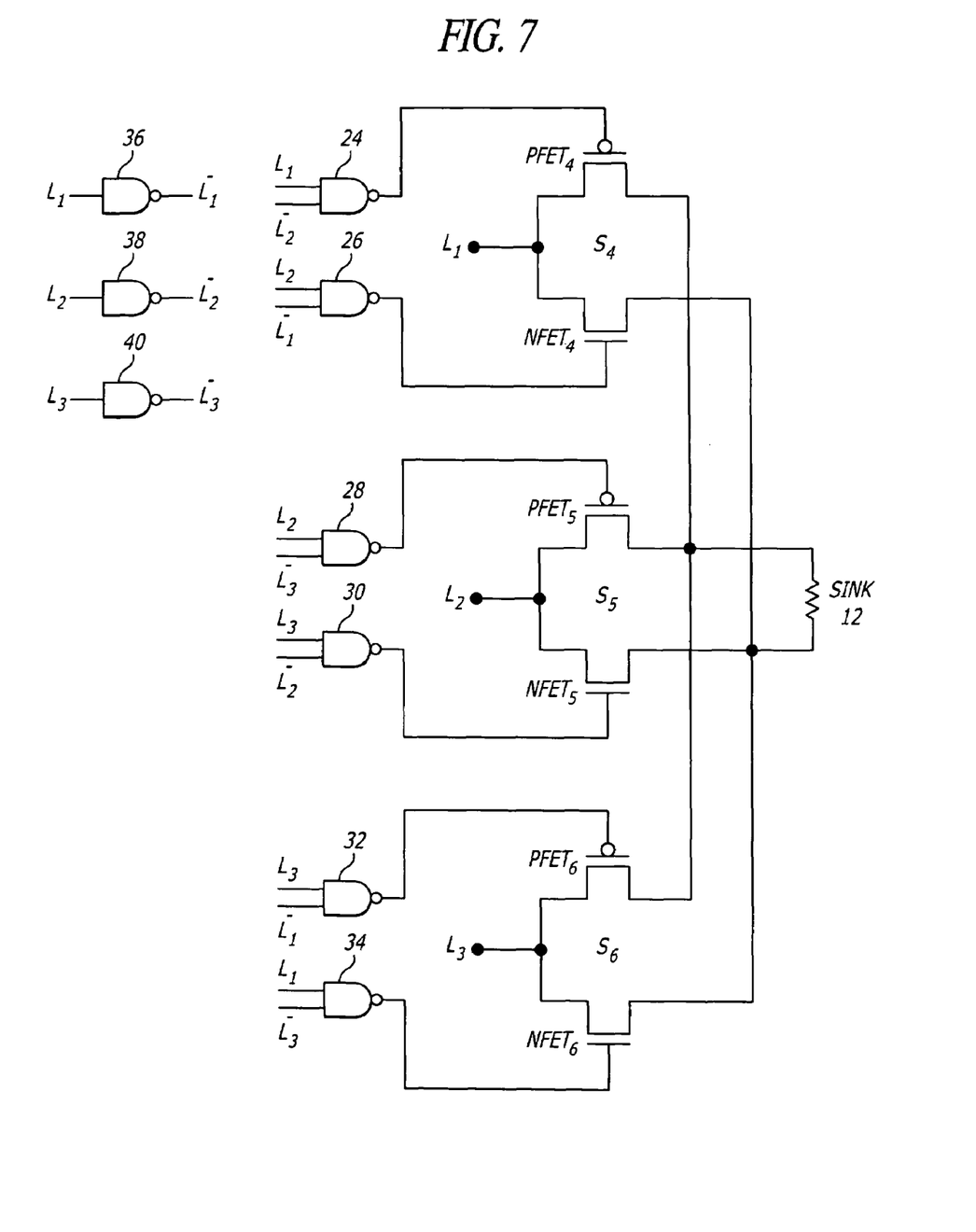
FIG. 7 shows a schematic circuit diagram of the second switch set of an embodiment of the invention of FIG. 1.

An embodiment of the second switch set 18 is shown in FIG. 7. Switches $S_4$, $S_5$ and $S_6$ are coupled to conductors $L_1$, $L_2$ and $L_3$ respectively and to DC sink 12. The switching protocol is designed to have only one conductor that is presently coupled to a particular polarity side of the source 10 coupled to the same particular polarity side of the sink 12. Simultaneously another of the conductors is coupled between the other polarity side of source 10 and the other polarity side of the sink 12. Concurrently the third conductor at the second switch set 18 is unconnected or put in a "neutral position" (n). As the polarities on the conductors change due to clocking the first switch set 16, the monitored signals on the conductors cause the second switch set 18 to adjust the switches $S_4$, $S_5$ and $S_6$ to a condition that maintains the switching protocol.

As an example, reference is made to the switch setting table of FIG. 6 and the circuit diagram of FIG. 7. Arbitrarily starting at time slice 5, the switch setting for $S_4$, $S_5$ and $S_6$ as shown being set by the prior clocking event cause; (1) switch 4 to be in the neutral (floating) condition and $L_1$ not connected to the sink 12; (2) $S_5$ to connect $L_2$ to the positive side of sink 12; and (3) $S_6$ to connect $L_3$ to the negative of sink 12. The "ones" and "zeros" shown in FIG. 6 are added as a convenience to indicate conventional high and low respectively. At time slice 6, switch set 18 causes: (1) $S_4$ to connect $L_1$ to the negative side of sink 12; (2) $S_5$ to connect $L_2$ to the positive side of sink 12; and (3) $S_6$ to be in the neutral condition and $L_3$ not connected to the sink 12, and so on.

For the instance, when both sides of the sink are at the same polarity, but at different potentials, the voltage across the sink 12 will be the difference between such different potentials. The logic is fully capable of recognizing these different potentials and functioning to accomplish the switching protocol. The switch settings are implemented by the circuit shown in the schematic of FIG. 7 and an explanation of implementation using the conductor potentials at time slice 5 is presented below. At time slice 5: $L_1$ is high (plus or 1, $L_2$ is high (plus or 1), and $L_3$ is low (minus or 0). Accordingly:

The output of NAND gate 24 is high and PFET 4 is off; the output of NAND gate 26 is low and NFET 4 is off and therefore $S_4$ is in the neutral condition with L, unconnected to either polarity side of sink 12.

The output of NAND 28 is low and PFET 5 is on, the output of NAND gate 30 is low and NFET 5 is off. Therefore $S_5$ is in the positive condition with $L_2$ connected to the positive polarity side of sink 12.

The output of NAND gate 32 is high and PFET 6 is off and the output of NAND gate 34 is high and NFET 6 is on and $L_3$ is connected to the negative polarity side of sink 12.

In a similar manner the states of the switches $S_4$, $S_5$ and $S_6$ can be determined at every time slice. As shown in FIG. 7, the inverted value of the conductor potentials are required as selected inputs of NAND gates 24 to 34 and to obtain such inverted values of the polarity on each conductor, NAND gates 36, 38 and 40 are used for conductors $L_1$, $L_2$ and $L_3$ respectively.

The sink 12 may take the form of, but not be limited to, a rechargeable battery, a capacitor or other energy storage device or load such as an electronic circuit. There are several ways in which to provide start up power to the logic gates of switch set 18 in order for the gates to perform their intended function. For example, a monitoring circuit may be configured to detect the voltages on the gates and if below operating thresholds, momentarily connect a small battery to the gates at selected locations so as to cause them to function.

However, another technique to provide start up power is to utilize the parasitic elements typically found in N-MOS and P-MOS devices which comprise the various gates. The parasitic elements function as full wave rectifier circuits albeit a somewhat inefficient rectifier circuit. After a few cycles of inefficient rectification by the parasitic elements, sufficient charge is stored within the circuit to provide initial operating voltages. Once the gates commence functioning they are able to operate to perform their intended and efficient function. For a complete and detailed discussion of the foregoing technique, reference is made to U.S. Pat. No. 5,999,849, entitled "Low Power Rectifier Circuit for Implantable Medical Device", which is incorporated herein in its entirety.

Furthermore, although an embodiment of the invention has been described in terms of a predetermined frequency, it is to be understood that the clocking signal may have a variable, random frequency or a frequency that sweeps over a range of frequencies.

To further isolate body tissue from the possibility of exposure to direct current signals, isolation capacitors $C_1$, $C_2$ and $C_3$ may be placed in series circuit arrangement between switch set 16 and conductors $L_1$, $L_2$ and $L_3$ respectively, and isolation capacitors (not shown in the Figures) may be placed in series circuit arrangement between $L_1$, $L_2$ and $L_3$ respectively and switch set 18.

Figure 8:
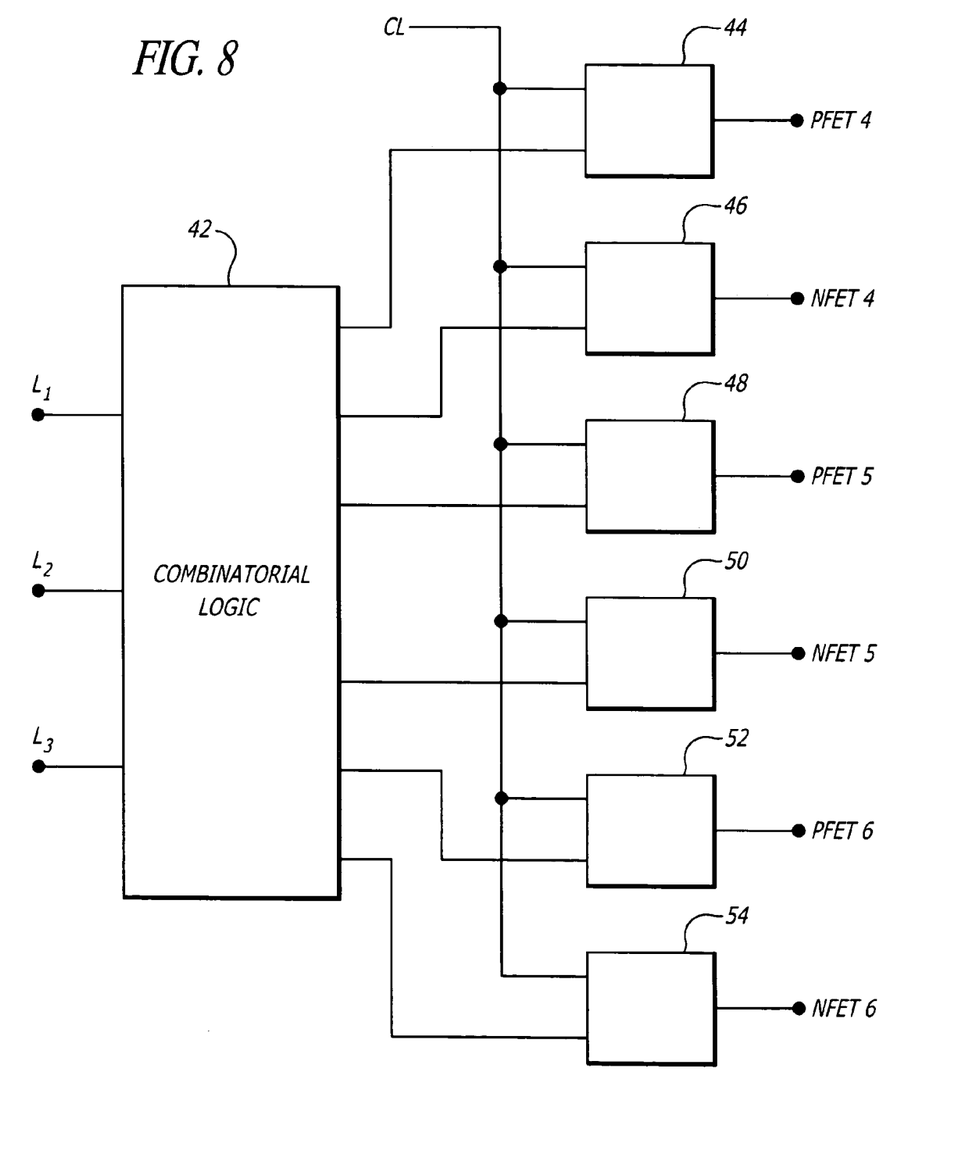
FIG. 8 shows a block diagram of an alternate embodiment of the second switch set of the embodiment of FIG. 7

An alternate embodiment of the second switch set 18 is shown in FIG. 8. The combinatorial logic is configured in a manner related to NAND gates 24 to 40 to achieve the proper input signals for blocks 44 to 54 such that the FET gate drive signals for PFET4, NFET4, etc., to NFET6 are synchronized to the connection of conductors $L_1$, $L_2$ and $L_3$ to the sink 12 in a manner so that at every clocking signal, at least one conductor is coupled between the same polarity side of the source 10 and the sink 12 and at least one other conductor is coupled between the same other polarity side of the source 10 and sink 12. The embodiment of FIG. 8 requires an additional conductor for conductors 14 dedicated for carrying the clocking signals.

What is claimed is:

1. A DC to DC transmission system comprising:
    a DC voltage source having a first voltage side and a second voltage side;
    a DC voltage sink having a first voltage side and a second voltage side;
    at least three conductors interconnecting the DC voltage source and the DC voltage sink, each of said conductors having a proximal end and a distal end;

a first switch set comprising one respective switch for each one of the at least three conductors, each respective switch of said first switch set interposed between the DC voltage source and the proximal end of a respective one of the at least three conductors, each respective switch of said first switch set adapted to alternately couple the proximal end of a respective one of the at least three conductors to the DC voltage source first voltage side and to the DC voltage source second voltage side;

a second switch set comprising one respective switch for each one of the at least three conductors, each respective switch of said second switch set interposed between the distal end of a respective conductor and the DC voltage sink, each respective switch of said second switch set adapted to alternately couple the distal end of a respective one of said conductors to the DC voltage sink first voltage side and to the DC voltage sink second voltage side;

a second switch set controller adapted to sequentially switch said second switch set switches in a manner such that simultaneously at least one of said conductors is coupled to the DC voltage source first voltage side and the DC voltage sink first voltage side and at least another one of said conductors is coupled to the DC voltage source second voltage side and the DC voltage sink second voltage side.

2. The system of claim 1, wherein the switches of the first switch set alternately couple each of the conductors to the DC voltage source first voltage side and to the DC voltage source second voltage side in a predetermined sequence.

3. The system of claim 2, wherein the switches of the first switch set are switched at a predetermined rate.

4. The system of claim 3, wherein the switches are switched in the range of about fifty thousand to 800 thousand times per second.

5. The system of claim 4, wherein the switches are switched at about 200 thousand times per second.

6. The system of claim 3, wherein the second switch set controller is coupled to the at least three conductors, said controller being adapted to determine to which voltage side of the DC voltage source each respective conductor is connected and to cause the second switch set switches to be switched as a function of which side of the DC voltage source each respective conductor is connected.

7. The system of claim 6, wherein the switches of the second switch set are configured for selectively coupling a respective one of said conductors to the DC voltage sink first voltage side and to the DC voltage sink second voltage side and are further configured for selectively setting a respective one of said conductors as floating thereby unconnected to the DC voltage sink.

8. The system of claim 7, wherein the controller causes the second switch set to be switched such that one of said conductors coupled to the DC voltage source first voltage side is coupled to the DC voltage sink first voltage side and another one of said conductors coupled to the DC voltage source second voltage side is coupled to the DC voltage sink second voltage side.

9. The system of claim 3, wherein each of said switches of the first switch set comprises a PFET and a NFET in series circuit arrangement, the PFET coupled to the DC voltage source first voltage side and the NFET coupled to the DC voltage source second voltage side, each of said switches coupled to a respective one of said conductors, the gates of the PFET and NFET driven in a manner so as to cause the conductor to be coupled to the DC source voltage first voltage side and to the DC voltage source second voltage side as a function of PFET and NFET gate potentials.

10. The system of claim 9, further comprising a ring counter having a number of flip flops equal to the number of the conductors, each flip flop output coupled to a respective one of said switches in the first switch set, the ring counter having a clock signal driving the switches at the predetermined rate.

11. The system of claim 1, wherein the first voltage side of the DC voltage source and the DC voltage sink have a positive potential and the second voltage side of the DC voltage source and the DC voltage sink are at ground potential.

12. The system of claim 1, wherein the first voltage side of the DC voltage source and the DC voltage sink have a negative potential and the second voltage side of the DC voltage source and the DC voltage sink are at ground potential.

13. The system of claim 1, wherein the first voltage side of the DC voltage source and the DC voltage sink have a positive potential and the second voltage side of the DC voltage source and the DC voltage sink have a negative potential.

14. The system of claim 1, wherein the first voltage side of the DC voltage source and the DC voltage sink have a negative potential and the second voltage side of the DC voltage source and the DC voltage sink have a positive potential.

15. The system of claim 1, wherein the first voltage side of the DC voltage source and the DC voltage sink are at ground potential and the second voltage side of the DC voltage source and the DC voltage sink have a positive potential.

16. The system of claim 1, wherein the first voltage side of the DC voltage source and the DC voltage sink are at ground potential and the second voltage side of the DC voltage source and the DC voltage sink have a negative potential.

17. The system of claim 1, wherein the first voltage side and the second voltage side of the DC voltage source and DC voltage sink have the same polarity and wherein the first voltage side of the DC voltage source and the DC voltage sink are at a first potential and the second voltage side of the DC voltage source and the DC voltage sink are at a second potential.

18. The system of claim , further comprising isolation capacitors connected in series circuit arrangement between each one of said respective switches of the first switch set and each one of said respective conductors.

19. A DC to DC transmission system comprising:
DC voltage source means for providing a source of DC voltage;
DC voltage sink means for providing a load to the DC voltage source means;
conductor means having a plurality of electrical conductors for interconnecting the DC voltage source means to the DC voltage sink means;
first switch means disposed between the DC voltage source means and the conductor means for sequentially coupling each one of said plurality of conductors to the DC voltage source means in a predetermined sequence and at a predetermined rate; and
second switch means disposed between the conductor means and the DC sink means for alternately coupling each one of the conductors of said plurality of conductors to the DC voltage sink means in a predetermined sequence and at a predetermined rate.

20. The system of claim 19, wherein the first switch means includes means for coupling said conductor means to said DC voltage source means and wherein the second switch means includes means for coupling at least two conductors of said conductor means to the DC voltage sink means in a manner such that said at least two conductors are simultaneously coupled to the DC voltage source means and the DC voltage sink means.

21. The system of claim 20, wherein the DC voltage source means has a first polarity side and a second polarity side and the DC voltage sink means has a first polarity side and a second polarity side wherein the second switch means includes means for alternately coupling the conductor means to the DC voltage sink means in a manner such that at least one of said conductors is simultaneously coupled to both the DC voltage source means and the DC voltage sink means first polarity sides and at least another one of said conductor is simultaneously coupled to both the DC voltage source means and the DC voltage sink means second polarity sides.

22. The system of claim 21, wherein the first polarity side of both the DC source voltage means and the DC voltage sink means have a positive potential and the second polarity side of both the DC source voltage means and the DC voltage sink means is at ground potential.

23. The system of claim 21, wherein the first polarity side of both the DC source voltage means and the DC voltage sink means have a negative potential and the second polarity side of both the DC voltage source means and the DC voltage sink means is at ground potential.

24. The system of claim 21, wherein the first polarity side of both the DC voltage source means and the DC voltage sink means have a positive potential and the second polarity side of both the DC voltage source means and the DC voltage sink means have a negative potential.

25. The system of claim 21, wherein the first polarity side of both the DC voltage source means and the DC voltage sink means side have a negative potential and the second polarity side of both the DC voltage source means and the DC voltage sink means have a positive potential.

26. The system of claim 21, wherein the first polarity side of both the DC voltage source means and the DC voltage sink means is at ground potential and the second polarity side of both the DC source voltage means and the DC voltage sink means have a positive potential.

27. The system of claim 21, wherein the first polarity side of both the DC source voltage means and the DC voltage sink means is at ground potential and the second polarity side of both the DC voltage source means and the DC voltage sink means have a negative potential.

28. The system of claim 21, wherein the first polarity side of both the DC source voltage means and the DC voltage sink means and the second polarity side of both the DC voltage source means and the DC voltage sink means have the same polarity and wherein the first polarity side of both the DC source voltage means and the DC sink means are at a first potential and the second polarity side of both the DC voltage source means and the DC voltage sink means are at a second potential.

29. The system of claim 20, comprising first capacitor means in series circuit arrangement between the DC voltage source means and the conductor means for blocking static DC signals from appearing on the conductor means.

30. A method of transferring electrical energy from a DC source to a DC sink comprising the steps of:
providing a DC source;
providing a DC sink;
providing a plurality of conductors capable of interconnecting the DC source to the DC sink;
alternately coupling each one of the plurality of conductors to the DC source in a predetermined sequence and at a predetermined rate; and
alternately coupling each one of the plurality of conductors to the DC sink in a manner such that at least one of said conductors is simultaneously coupled to the DC source and the DC sink and at least another one of said conductors is simultaneously coupled to the DC source and the DC sink.

31. The method of claim 30, wherein the DC source has a first polarity side and a second polarity side and the DC sink has a first polarity side and a second polarity side, the method further comprising the step of alternately coupling the conductors to the DC source and the DC sink such that, at any given time, at least one conductor is coupled between the DC source first polarity side and the DC sink first polarity side and at least one other conductor is simultaneously coupled between the DC source second polarity side and the DC sink second polarity side.

32. The method of claim 31, further comprising the steps of providing a first switch set disposed between the DC source and the plurality conductors, said conductors having a proximal end and a distal end; and
controlling the first switch set for sequentially coupling the proximal end of each one of said plurality of conductors to the DC source in said predetermined sequence and at said predetermined rate.

33. The method of claim 32, further comprising the steps of providing a second switch set disposed between the distal end of each one of said plurality of conductors and the DC sink; and
controlling the second switch for alternately coupling each one of the conductors of said plurality of conductors to the DC sink in a predetermined sequence and at a predetermined rate.

34. The method of claim 33, further comprising the step of synchronizing the controlling of the second switch set with the first switch set such that one of said conductors of the plurality of conductors is simultaneously coupled to the DC source first polarity side and the DC sink first polarity side and another one of said conductors of the plurality of conductors is simultaneously coupled to the DC source second polarity side and the DC sink second polarity side.

35. An implantable power transmission system, comprising:
a power transmission line comprising a plurality of electrical conductors having a near end and a far end;
a power source coupled to the near end of the conductors;
a load coupled to the far end of the conductors and adapted to receive power from the power source;
a first switch disposed between the power source and the near end of the conductors, the first switch adapted for periodically coupling and decoupling the power source to and from selected ones of the conductors of the transmission line; and
a second switch disposed between the load and the far end of the conductors and adapted for periodically coupling and decoupling selected ones of the conductors to and from the load, the coupling and decoupling of the load being synchronized with the coupling and decoupling of the power source to and from the transmission line such that at least two conductors are simultaneously coupled between the power source and the load.

36. The system of claim 35, wherein the power source has a first polarity side and a second polarity side and the load has a first polarity side and a second polarity side, wherein the first and second switches are synchronized such that during transmission of power from the power source to the load, at least one of said conductors is coupled between the first polarity side of the power source and the first polarity side of the load and at least another one of said conductors is coupled between the second polarity side of the power source and the second polarity side of the load.

37. The system of claim 36, wherein the coupling and decoupling of the power source and the load to and from the transmission line is at a predetermined frequency.

38. The system of claim 36, wherein the coupling and decoupling of the power source and the load to and from the transmission line is at a predetermined sequence.

* * * * *